United States Patent [19]

Newbould

[11] 4,370,691
[45] Jan. 25, 1983

[54] PROTECTION APPARATUS FOR ELECTRIC POWER TRANSMISSION SYSTEMS

[75] Inventor: Adrian O. Newbould, Hixon, England

[73] Assignee: The General Electric Company Limited, London, England

[21] Appl. No.: 246,374

[22] Filed: Mar. 23, 1981

[30] Foreign Application Priority Data

Mar. 21, 1980 [GB] United Kingdom ............... 8009709

[51] Int. Cl.³ .............................................. H02H 7/00
[52] U.S. Cl. ........................................ 361/62; 307/44
[58] Field of Search ..................... 361/62, 63, 65, 79, 361/113; 307/44, 89, 91

[56] References Cited

U.S. PATENT DOCUMENTS 3,430,103  2/1969  Rockefeller, Jr. ................. 361/63

FOREIGN PATENT DOCUMENTS 1098590  2/1961  Fed. Rep. of Germany .

Primary Examiner—Reinhard J. Eisenzopf
Attorney, Agent, or Firm—Kirschstein, Kirschstein, Ottinger & Cobrin

[57] ABSTRACT

In a protection apparatus for a feeder (H) of an electric power transmission system compensation for mutual coupling between the feeder and another feeder (G) is controlled in dependence on the ratio of the zero sequence currents ($I_M$, $I_N$) in the two feeders. The mutual coupling compensation signal ($I_M Z_M'$) is arranged to be proportional to the zero sequence current ($I_M$) in the other feeder when the ratio of the zero sequence currents is below a predetermined value, and to be limited to a value proportional to the protected feeder zero sequence current ($I_N$) when said ratio is above the predetermined value. The arrangement reduces the possibility of maloperation of the feeder protection due to faults on the other feeder.

6 Claims, 5 Drawing Figures

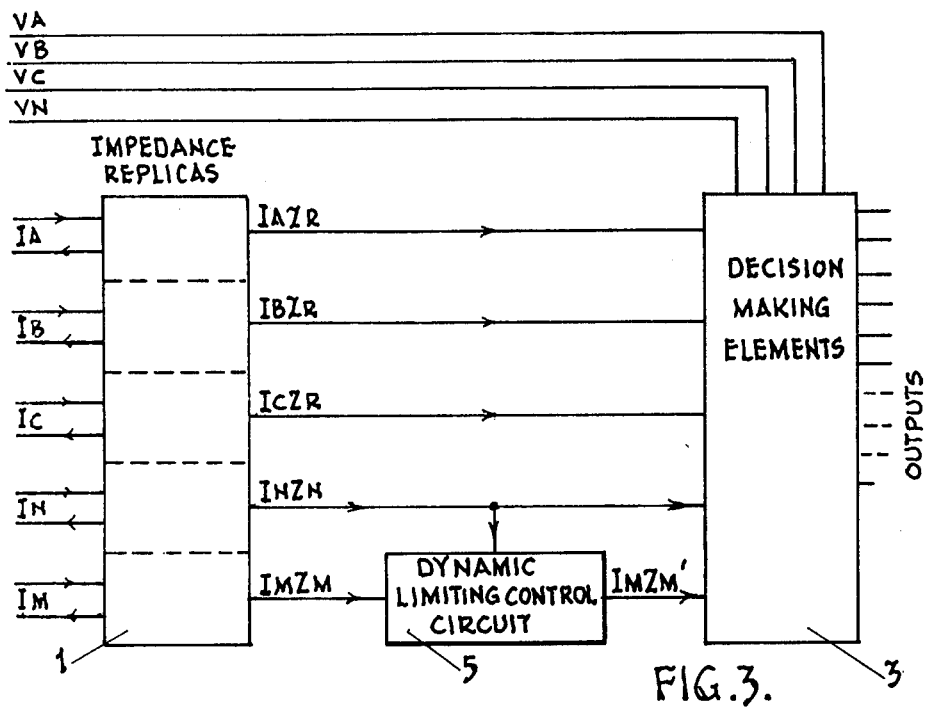
FIG.3.
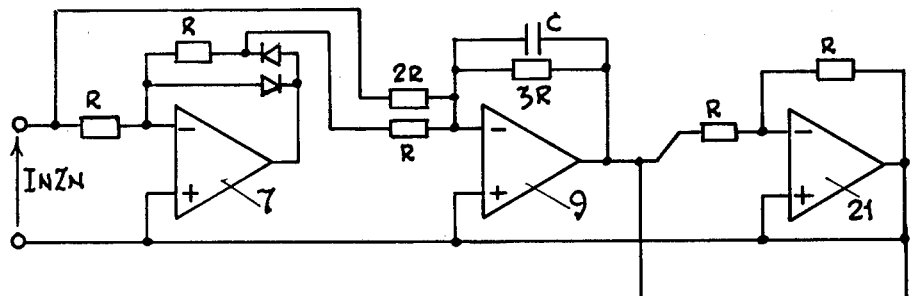
FIG.4.
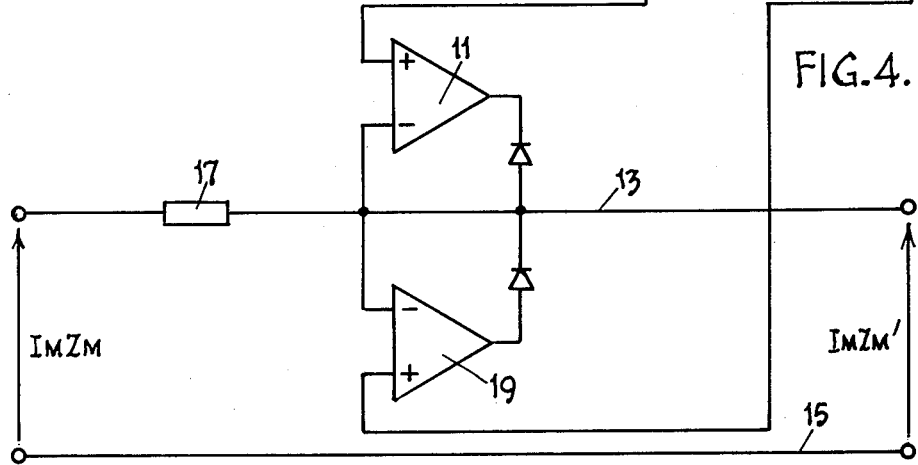

PROTECTION APPARATUS FOR ELECTRIC POWER TRANSMISSION SYSTEMS

This invention relates to protection apparatus for electric power transmission systems.

A significant level of mutual inductive coupling in the earth loop is known to occur between high voltage electric power transmission lines especially when two feeders are connected in close proximity over a long distance. This situation happens frequently because of the usual construction practice of hanging parallel circuits on opposite sides of a route of towers. Where impedance measuring elements, i.e. distance relays, are utilised for protection then the effect of the earth loop mutual coupling is to alter the impedance reach of the relays which is undesirable. This can be overcome by adding mutual coupling compensation to the distance relays. Unfortunately the standard form of such compensation is not ideal and has its own problems. The major disadvantage is that faults on one feeder can cause maloperation of the healthy feeder protection with the result that both feeders are tripped. This seriously degrades one of the major advantages of parallel feeders, namely security of supply following a fault clearance on either feeder.

To alleviate this problem it has been proposed that, in a protection apparatus for a feeder of an electric power transmission system incorporating compensation for mutual coupling between the feeder and another feeder, the mutual coupling compensation signal be controlled in dependence on the ratio of the zero sequence currents in the other feeder and the protected feeder, the compensation being cut-off when the ratio exceeds a predetermined value. Such an arrangement is described in German Patent Specification No. DAS 1,098,590.

Such an arrangement has the disadvantage that quite a substantial time is necessary to arrive at a decision as to whether or not to cut-off the compensation and to effect cutting-off of the compensation. Thus, such an arrangement is not suitable for use in modern protection apparatus in which minimum operating times of 5 milliseconds or even lower are common.

It is an object of the present invention to provide a protection apparatus for an electric power transmission system incorporating mutual coupling compensation wherein this advantage is overcome.

According to the present invention in a protection apparatus for a feeder of an electric power transmission system incorporating compensation for mutual coupling between the feeder and another feeder, the mutual coupling compensation signal is arranged to be proportional to the zero sequence current in the other feeder when the ratio of the zero sequence currents in the other feeder and the protected feeder is below a predetermined value, and when said ratio is above said predetermined value is limited to a value proportional to the protected feeder zero sequence current.

It will be appreciated that the required limiting can be effected almost instantaneously and does not involve the sort of time delay which is necessary with the prior art arrangement wherein before cutting-off the mutual coupling compensation it is desirable to be sure that the high zero sequence current ratio condition is a permanent condition and not merely a transient condition.

The invention will now be further explained and one apparatus in accordance with the invention will be described by way of example with reference to the accompanying drawings in which:

FIG. 3 is a diagram illustrating a distance relay incorporating a mutual coupling compensation arrangement in accordance with the invention;

FIG. 4 is a circuit diagram of part of the mutual coupling compensation arrangement of FIG. 3.

Figure 1:
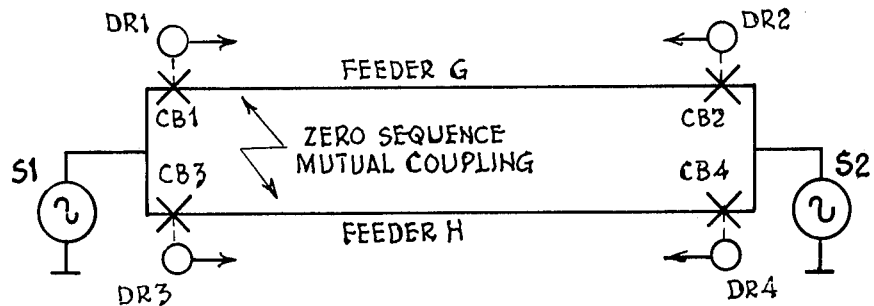
FIG. 1 is a diagram illustrating an electric power transmission system incorporating a pair of parallel feeders provided with protection apparatus.

Referring to FIG. 1 the transmission system comprises a parallel pair of feeders G and H connecting two sources of 3-phase a.c. electrical power S1 and S2, the required 3-phase line arrangements being indicated by single lines in FIG. 1.

The feeders are protected by four circuit breakers CB1 to CB4 one connected at each end of each feeder. The circuit breakers are controlled by respective distance relays DR1 to DR4.

Each relay determines the values relative to set values of various impedances of its associated feeder in a direction towards the other distance relay associated with that feeder, and on the basis of the result of such determination makes a decision as to whether its associated circuit breaker should be opened.

One relay DR3 will now be described in further detail, the four relays being essentially identical.

Figure 2:
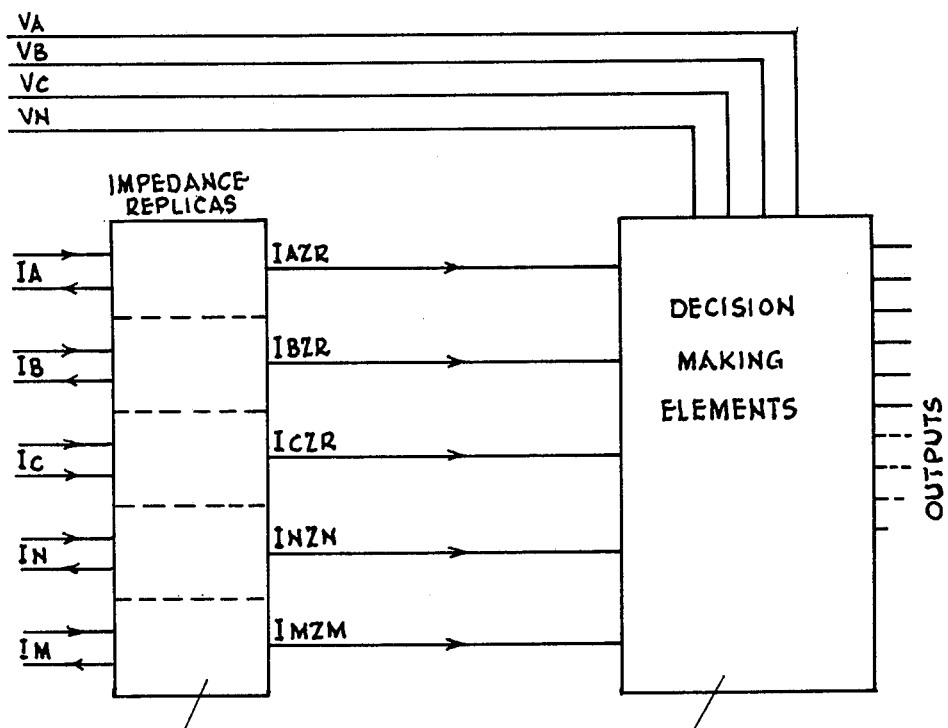
FIG. 2 is a diagram illustrating a distance relay forming part of the protection apparatus and incorporating the standard form of mutual coupling compensation.

Referring to FIG. 2 the relay is supplied by way of current transformers (not shown) with currents $I_A$, $I_B$ and $I_C$ respectively representative of the currents of the three phases of the associated feeder H. The currents $I_A$, $I_B$ and $I_C$ are also summed and the resultant current $I_N$, which is three times the zero sequence current of the feeder H, is used to provide neutral compensation of the earth fault impedance determining elements in the relay.

In addition, currents representative of the phase currents of the parallel feeder G are summed to provide a current $I_M$ representative of three times the zero sequence current of the feeder G, this current being used to provide mutual coupling compensation of the earth fault impedance determining elements in the relay.

The relay includes impedance replicas $Z_R$, $Z_N$ and $Z_M$, represented by block 1 in FIG. 2, whose magnitudes and phase angles determine the phase impedance, neutral compensation and mutual coupling compensation settings respectively of the relay. These impedance replicas together with the current inputs are utilised to produce voltages $I_A Z_R$, $I_B Z_R$, $I_C Z_R$, $I_N Z_N$ and $I_M Z_M$. These voltages together with voltages $V_A$, $V_B$, $V_C$ and $V_N$ respectively representative of the phase and neutral voltages of the feeder H are fed to decision making elements 3 of the relay wherein a decision is made as to whether the associated circuit breaker should be opened.

As has been described in an article by E. B. Davision and A. Wright entitled "Some factors affecting the accuracy of distance type protective equipment under earth-fault conditions" appearing in the September 1963 edition of the Proceedings of the Institute of Electrical Engineers (No. 9 Vol. 110), the arrangement of FIG. 2 works correctly for earth faults on the feeder H which the relay is protecting, but can maloperate for earth faults on the parallel feeder G.

Examination of conditions for the two types of fault shows that for faults on the protected feeder H the neutral compensation signal is never less than the mutual compensation signal (the actual ratio depends on line parameters), however, for faults on the parallel feeder G when relay maloperation occurs then $I_M Z_M$ is much greater than $I_N Z_N$.

In accordance with the invention this difficulty is overcome by controlling the mutual coupling compensation signal supplied to the decision making elements of the relay in dependence on the neutral current compensation signal by means of a dynamic limiting control circuit 5, as shown in FIG. 3. As a result, instead of utilising the signal $I_M Z_M$ for mutual coupling compensation, the decision making elements of the relay of FIG. 3 utilise a signal $I_M Z_M'$ where $$I_M Z_M' = I_M Z_M \text{ when } I_M Z_M < K I_N Z_N$$

and $$I_M Z_M' \text{ is limited to } K I_N Z_N \text{ when } I_M Z_M > K I_N Z_N$$

The constant K is chosen to split the gap between the correct compensation conditions and the limiting conditions thus giving a safety margin for both situations. Thus for faults on the protected feeder when the mutual compensation is correct the limit is always above the $I_M Z_M$ signal and therefore does not influence the signal. When faults occur on the parallel feeder the limiting action comes in before the mutual compensation is large enough to cause maloperation. Studies have shown that a K value of 1.5 will generally give adequate safety margins between conditions requiring correct mutual compensation and those requiring limiting. The K value can be made adjustable, if desired, in case 1.5 proved unsuitable for particular power systems.

Obviously the response time of the dynamic control circuit must be faster than the operating time of the distance relay to which it is applied. The trend in new designs of such relays is for minimum operating times of around 0.25 cycles or 5 mS for a 50 Hz system. The proposed control has no inherent delays and is suitable for application for very high speed protection. One practical arrangement which has been built and tested has a speed of response of typically 1 mS.

The type of limiting required depends on the measurement principles of the protection to which it is applied. There are two possible forms, peak limiting and waveshape limiting. The former is simple and inexpensive, however, difficulties can arise because the signal $I_M Z_M'$ approaches a square wave as the ratio of $I_M Z_M$ to $I_N Z_N$ increases. Some relays could be adversely affected by one of the input signals having a square instead of a sine waveshape. This is easily overcome by controlling the waveshape such that it has an approximate sine waveshape. This method is considered suitable for all known measuring principles used in relays. Since the limiting is applied only to prevent maloperation then the $I_M Z_M'$ signal can have significant distortion under these conditions. The critical factor tends to be the maximum rate of rise of any part of the waveform, and it is this which must be controlled.

An example of a practical circuit to accomplish the required dynamic control with K equal to 1.5 and incorporating the waveshape limiting mentioned above is shown in FIG. 4. This circuit uses commonly available components and will work over the wide dynamic range encountered in protection applications.

The circuit comprises a two-stage feedback amplifier arrangement comprising operational amplifiers 7 and 9 to which the signal $I_N Z_N$ is applied as input, the arrangement providing an output of 1.5 $I_N Z_N$ at the output of the second amplifier 9. The output of the amplifier 9 is applied to a further operational amplifier 11 which serves to limit excursions of one polarity of the signal on a pair of lines 13 and 15, to which the signal $I_M Z_M$ is applied via a resistor 17, to the value 1.5 $I_N Z_N$. A further amplifier 19 to which the output of amplifier 9 is applied via an inverter comprising an operational amplifier 21 serves to limit excursions of the signal on the lines 13 and 15 of the other polarity to the value 1.5 $I_N Z_N$.

Figure 5:
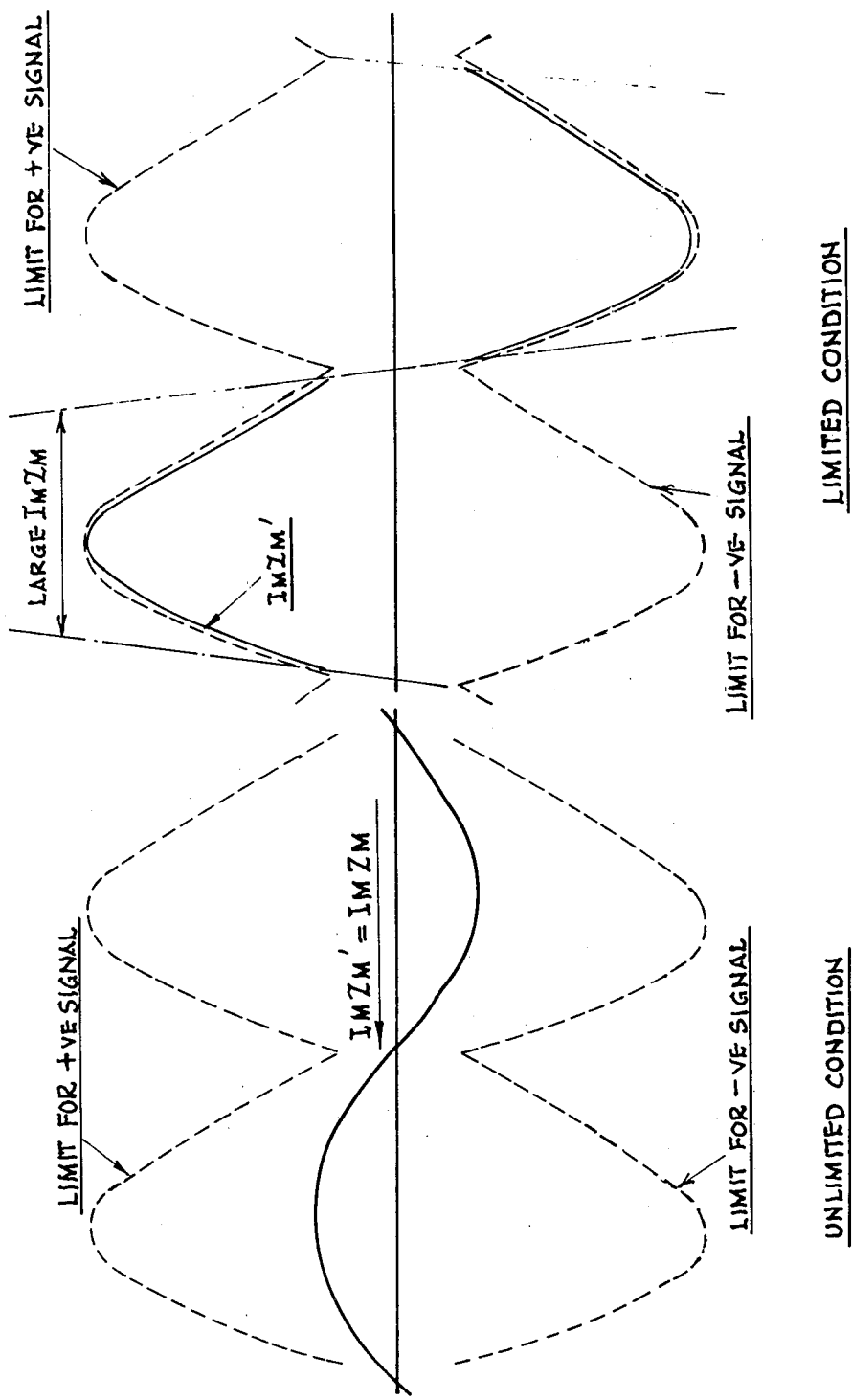
FIG. 5 shows waveforms illustrating the operation of the circuit of FIG. 4.

FIG. 5 gives examples of the signal waveforms for the unlimited and the limited conditions. The power system parameters dictate that the currents $I_N$ and $I_M$ will be close to being either in-phase or anti-phase, this helps in the case where waveshape limiting is applied, as shown in the diagrams. The unlimited condition waveforms are an example of a fault on the protected feeder where the mutual compensation is less than $K I_N Z_N$ and therefore the signal $I_M Z_M'$ is the correct mutual compensation. The limited condition waveforms are typical of faults on the parallel feeder where maloperation on standard mutual compensation could occur. The input signal $I_M Z_M$ is much greater than $K I_N Z_N$ and hence the limits apply and control the size of the signal $I_M Z_M'$. This signal shows some distortion, but this is unlikely to cause problems in the distance relay. If necessary, the signal $I_M Z_M$ can be filtered to reduce the distortion.

I claim:

1. A protection apparatus for a feeder of an electric power transmission system incorporating compensation for mutual coupling between the feeder and another feeder including: means for deriving a first signal representative of the zero sequence current in a feeder to be protected by the apparatus; means for deriving a second signal representative of the zero sequence current in another feeder with which the protected feeder is mutually coupled; and means responsive to said first and second signals to produce a signal for compensating for said mutual coupling, said mutual coupling compensation signal being proportional to the zero sequence current in the other feeder when the ratio of the zero sequence currents in the other feeder and the protected feeder is below a predetermined value, and when said ratio is above said predetermined value being limited to a value proportional to the protected feeder zero sequence current.

2. An apparatus according to claim 1 wherein said mutual coupling compensation signal is equal to $I_M Z_M$ when $I_M Z_M < K I_N Z_N$ and is limited to $K I_N Z_N$ when $I_M Z_M > K I_N Z_N$ where:

$I_M$ is a current representative of the zero sequence current of the other feeder;

$I_N$ is a current representative of the zero sequence current of the protected feeder;

$Z_M$ and $Z_N$ are replica impedances whose magnitudes and phase angles determine the mutual coupling compensation and neutral compensation settings respectively of the apparatus; and K is a constant.

3. An apparatus according to claim 2 wherein the value of K is 1.5.

4. An apparatus according to claim 1 wherein, when limited, said mutual coupling compensation signal is waveshape limited.

5. An apparatus according to claim 4 wherein, when limited, said mutual coupling compensation signal has an instantaneous value proportional to the instantaneous value of the protected feeder zero sequence current.

6. An apparatus according to claim 1 wherein said means responsive to said first and second signals comprises: an impedance, a pair of lines to which said second signal is applied via said impedance; and means responsive to said first signal to limit excursions of the signal between said lines to a value proportional to said first signal, said signal between said lines being said mutual compensation signal.

* * * * *